GEORGE F. STONE.
Earth Commode.
No. 125,627.                                           Patented April 9, 1872.
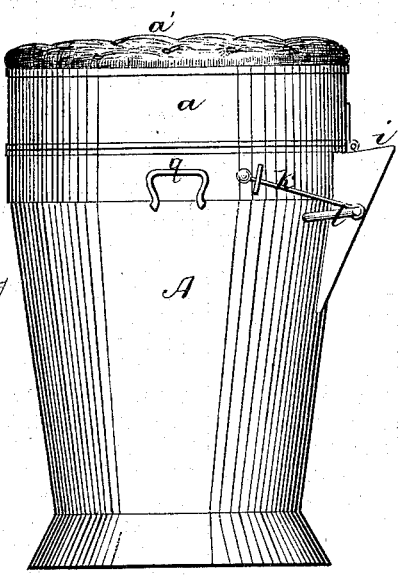
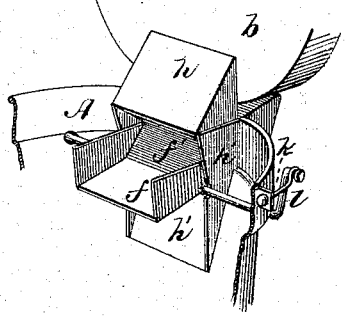
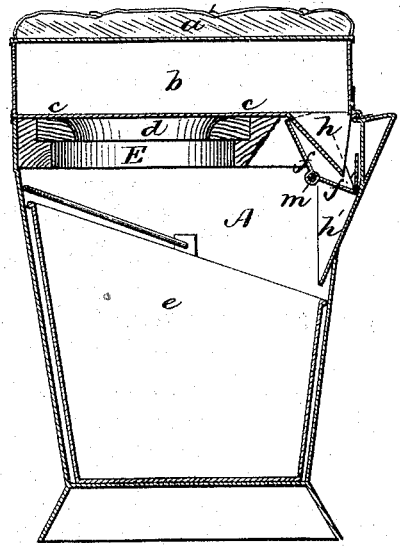
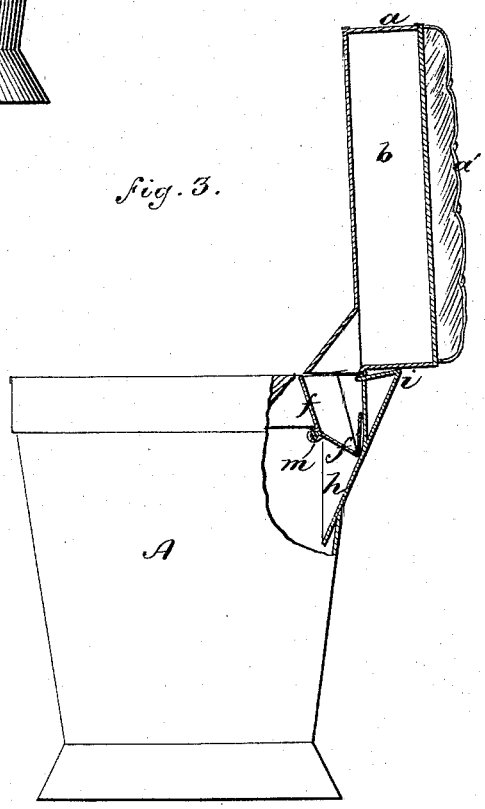
Witnesses.
C. F. Brown
R. H. Keele
Inventor:
Geo. F. Stone.
By his attys.
Hill & Ellsworth 125,627

UNITED STATES PATENT OFFICE.

GEORGE F. STONE, OF BALTIMORE, MARYLAND.

IMPROVEMENT IN EARTH-COMMODES.

Specification forming part of Letters Patent No. 125,627, dated April 9, 1872.

*To all whom it may concern:*

Be it known that I, GEORGE F. STONE, of the city and county of Baltimore, in the State of Maryland, have invented a new and Improved Earth-Commode; and I do hereby declare the following to be a full, clear, and exact description of the same, reference being had to the accompanying drawing forming part of this specification, in which—

Figure 1 is a side elevation of my improved earth-closet with the cover closed. Fig. 2 is a central vertical section of the same. Fig. 3 is a side elevation, partly in section, and with the cover raised; and Fig. 4 is a perspective view of the valve and chute with the cover open.

Similar letters of reference in the accompanying drawing denote the same parts.

My invention has for its object to provide an improved earth-commode, which shall be simple in construction, and which can be supplied to the public at prices greatly reduced from those at present charged for devices of this class. To this end the invention consists, first, in combining a valve and chute with the cover and body of the commode in such a manner that the shutting of the cover automatically closes the valve in order to prevent a flow of earth from the reservoir, the valve being operated by a suitable handle to discharge a certain quantity of earth when the cover is raised. It consists, further, in providing the commode with a set of removable seats, graduated to different sizes, as I will now proceed to describe.

In the accompanying drawing, A is the body of the commode, made of sheet or cast metal in the form of a common slop-bucket, and provided with a hinged cover, $a$, and ears, $q$, or other suitable handle by which it can be moved from place to place. The cover $a$ is made of considerable depth to form a reservoir for containing the earth, and its upper surface is upholstered, as shown at $a'$, to produce an ornamental seat when the commode is not otherwise in use. $h$ is a spout, inclined rearward from the under side of the cover in front of the hinge thereof, and $h'$ is a spout secured to the interior of the commode immediately beneath the spout $h$ and inclined inward. When the cover is open the wide ends of the two spouts are together, as shown in Figs. 3 and 4, but when closed the wide end of the spout $h$ enters the spout $h'$, terminating near the back thereof. $f$ is an angular chute, mounted at the angle upon a transverse shaft, $m$, having its bearings in the side of the body A, so as to hold the chute within the spout $h'$, near the center. If desired, the chute may be curved instead of angular, and the shaft may also have its bearings in the side of the spout $h'$. The chute occupies such a position with respect to the spout $h'$ that its forward end shall project within the commode, while the rear end extends within said spout, as shown in Fig. 4, immediately within the spout $h$. $f'$ is a valve, hinged to the rear edge of the chute $f$, and extending within the spout $h'$, as shown.

The operation of the mechanism thus far described is as follows: When the cover is closed the spout $h$ moves the front end of the chute upward, and the valve $f'$ backs against the body A—these respective parts occupying the position shown in Fig. 2 to, prevent the earth falling from the reservoir into the commode. When the cover is raised the earth from the reservoir flows down and fills the space above the chute and valve $f'$, when the chute is thrown down into the position shown in Fig. 4 by operating the handle $k$ attached to the crank end $l$ of the chute-shaft. This movement discharges the earth into the removable bucket $e$, and throws the valve forward beneath the end of the spout $h$ to close the same and prevent a further discharge from the reservoir. Owing to the curved or angular form of the chute the act of throwing it down throws the dirt across the bucket to cover the contents of the latter at the front side. When the cover is again closed the spout $h$ moves the chute and valve to their former positions, and in doing so causes the valve to drop a small quantity of earth from its rear side into the back of the bucket $e$.

A projection, $i$, at the rear of the body A, serves to hold the cover in an upright position when open, so that its weight shall not overbalance the commode. D is the seat-frame, supported within the body A by a bead or shoulder formed near the top of the latter. The seat-frame is adapted for removal when it is desired to remove the bucket $e$, and is provided with a large opening to receive the seats $d$, which are also removable.

I propose to construct the seats with openings of different sizes, and to supply them in sets for each commode, as will be readily understood.

If desired, the commode may be secured in a fixed position by screws or nails passing through the base flange.

Having thus described my invention, what I claim is—

1. In combination with the body A and the reservoir cover, I claim the curved or angular chute $f$ and the valve $f'$, substantially as described, for the purposes specified.

2. In combination with the body A and the reservoir cover, I claim the spouts $h\ h'$ and the valve and chute, substantially as described, for the purposes specified.

3. The removable seat-frame E of an earth-commode, adapted to receive seats $d$ of different sizes, substantially as described, for the purposes specified.

GEORGE F. STONE.

Witnesses:
 N. K. ELLSWORTH,
 E. A. ELLSWORTH.